(12) United States Patent  (10) Patent No.: US 9,383,045 B2
Santi et al.  (45) Date of Patent: Jul. 5, 2016

(54) THREADED JOINT WITH RESILIENT SEAL RING

(75) Inventors: Nestor J. Santi, Buenos Aires (AR); Gastón Mazzaferro, Buenos Aires (AR)

(73) Assignee: Tenaris Connections Limited, Kingstown, Saint Vincent/Grenadines ( * ) Notice: Subject to any disclaimer, the term of this patent is extended or adjusted under 35 U.S.C. 154(b) by 316 days.

(21) Appl. No.: 12/669,177

(22) PCT Filed: Jul. 15, 2008

(86) PCT No.: PCT/EP2008/059226
§ 371 (c)(1),
(2), (4) Date: Jan. 14, 2010

(87) PCT Pub. No.: WO2009/010507
PCT Pub. Date: Jan. 22, 2009

(65) Prior Publication Data
US 2010/0181761 A1  Jul. 22, 2010

(30) Foreign Application Priority Data
Jul. 16, 2007  (EP) .................................... 07112536

(51) Int. Cl.
*F16L 15/00*  (2006.01)
*E21B 17/042*  (2006.01)
(52) U.S. Cl.
CPC ............. *F16L 15/003* (2013.01); *E21B 17/042* (2013.01)
(58) Field of Classification Search
CPC ............................. F16L 15/003; E21B 17/042

USPC ........... 285/333, 334, 355; 277/619, 647, 651
See application file for complete search history.

(56) References Cited

U.S. PATENT DOCUMENTS

| | | | |
|---|---|---|---|
| 1,590,357 A * | 6/1926 | Feisthamel | 285/332.1 |
| 1,671,458 A | 5/1928 | Wilson | |
| 1,799,762 A | 1/1929 | Rathbun | |
| 1,999,706 A | 4/1935 | Spang | |
| 2,075,427 A | 3/1937 | Church | |
| 2,211,173 A | 8/1940 | Shaffer | |
| 2,487,241 A | 11/1949 | Hilton | |

(Continued)

FOREIGN PATENT DOCUMENTS

| | | |
|---|---|---|
| AT | 388791 B | 8/1989 |
| CA | 2319926 | 7/2008 |

(Continued)

OTHER PUBLICATIONS

U.S. Appl. No. 13/072,533, filed Mar. 25, 2011, Della Pina, et al.

(Continued)

*Primary Examiner* — David E Bochna
*Assistant Examiner* — James Linford
(74) *Attorney, Agent, or Firm* — Knobbe, Martens, Olson & Bear, LLP

(57) ABSTRACT

A threaded joint comprises a seal ring positioned between a pin and a box, and located in a groove between the end of a threaded section and the nose of the box. The seal ring has a first base, a second base axially opposite to the first base, at least two protruding annular ribs on the external surface, and an internal surface comprising, in an unloaded position, two frustoconical annular surfaces tapering towards the center of the seal ring and joined by a fillet.

26 Claims, 4 Drawing Sheets

(56) References Cited

U.S. PATENT DOCUMENTS

| | | | |
|---|---|---|---|
| 2,539,057 A | 1/1951 | Brown | |
| 2,567,113 A | 9/1951 | Kristensen | |
| 2,631,871 A | 3/1953 | Stone | |
| 2,634,943 A | 4/1953 | Gulick | |
| 2,841,429 A | 10/1955 | McCuistion | |
| 2,766,998 A | 10/1956 | Watts et al. | |
| 2,916,306 A | 12/1959 | Rickard | |
| 2,992,021 A | 7/1961 | Nay | |
| 2,992,613 A | 7/1961 | Bodine | |
| 3,016,250 A | 1/1962 | Franck | |
| 3,041,088 A | 6/1962 | Brandon | |
| 3,054,628 A | 9/1962 | Hardy et al. | |
| 3,150,889 A | 9/1964 | Watts | |
| 3,219,354 A * | 11/1965 | Kazienko | 277/615 |
| 3,266,824 A | 8/1966 | Nealy | |
| 3,307,860 A | 3/1967 | Blount et al. | |
| 3,325,174 A | 6/1967 | Weaver | |
| 3,362,731 A | 1/1968 | Gasche et al. | |
| 3,366,392 A * | 1/1968 | Kennel | F16D 65/18 |
| | | | 277/448 |
| 3,489,437 A | 1/1970 | Duret | |
| 3,512,789 A | 5/1970 | Tanner | |
| 3,552,781 A | 1/1971 | Helland | |
| 3,572,777 A | 3/1971 | Blose et al. | |
| 3,575,430 A * | 4/1971 | Alpine | 277/615 |
| 3,592,491 A * | 7/1971 | Glover | 285/230 |
| 3,599,931 A | 8/1971 | Hanson | |
| 3,733,093 A | 5/1973 | Seiler | |
| 3,810,793 A | 5/1974 | Heller | |
| 3,854,760 A | 12/1974 | Duret | |
| 3,889,989 A | 6/1975 | Legris et al. | |
| 3,891,224 A | 6/1975 | Ditcher | |
| 3,893,919 A | 7/1975 | Flegel et al. | |
| 3,918,726 A | 11/1975 | Kramer | |
| 3,986,731 A | 10/1976 | DeHoff | |
| 4,014,568 A | 3/1977 | Carter et al. | |
| 4,147,368 A | 4/1979 | Baker et al. | |
| 4,219,204 A | 8/1980 | Pippert | |
| 4,299,412 A * | 11/1981 | Parmann | 285/110 |
| 4,310,163 A | 1/1982 | Pippert | |
| 4,345,739 A | 8/1982 | Wheatley | |
| 4,366,971 A | 1/1983 | Lula | |
| 4,368,894 A * | 1/1983 | Parmann | 277/615 |
| 4,373,750 A | 2/1983 | Mantelle et al. | |
| 4,384,737 A | 5/1983 | Reusser | |
| 4,406,561 A | 9/1983 | Ewing | |
| 4,426,095 A | 1/1984 | Buttner | |
| 4,473,471 A | 9/1984 | Robichaud et al. | |
| 4,475,839 A | 10/1984 | Strandberg | |
| 4,570,982 A | 2/1986 | Blose et al. | |
| 4,591,195 A * | 5/1986 | Chelette et al. | 285/332.3 |
| 4,592,558 A | 6/1986 | Hopkins | |
| 4,601,491 A | 7/1986 | Bell, Jr. et al. | |
| 4,602,807 A | 7/1986 | Bowers | |
| 4,623,173 A | 11/1986 | Handa et al. | |
| 4,662,659 A | 5/1987 | Blose et al. | |
| 4,674,756 A | 6/1987 | Fallon et al. | |
| 4,688,832 A | 8/1987 | Ortloff et al. | |
| 4,706,997 A | 11/1987 | Carstensen | |
| 4,762,344 A | 8/1988 | Perkins et al. | |
| 4,844,517 A | 7/1989 | Beiley et al. | |
| 4,856,828 A | 8/1989 | Kessler et al. | |
| 4,955,645 A | 9/1990 | Weems | |
| 4,958,862 A | 9/1990 | Cappelli et al. | |
| 4,988,127 A * | 1/1991 | Cartensen | 285/94 |
| 5,007,665 A | 4/1991 | Bovisio et al. | |
| 5,067,874 A | 11/1991 | Foote | |
| 5,137,310 A | 8/1992 | Noel et al. | |
| 5,143,381 A | 9/1992 | Temple | |
| 5,154,534 A | 10/1992 | Guerin et al. | |
| 5,180,008 A | 1/1993 | Aldridge et al. | |
| 5,242,199 A | 9/1993 | Hann et al. | |
| 5,348,350 A | 9/1994 | Blose et al. | |
| 5,505,502 A | 4/1996 | Smith et al. | |
| 5,515,707 A | 5/1996 | Smith | |
| 5,653,452 A | 8/1997 | Järvenkylä | |
| 5,712,706 A | 1/1998 | Castore et al. | |
| 5,794,985 A | 8/1998 | Mallis | |
| 5,810,401 A | 9/1998 | Mosing et al. | |
| 5,860,680 A | 1/1999 | Drijver et al. | |
| 5,879,030 A | 3/1999 | Clayson et al. | |
| 6,044,539 A | 4/2000 | Guzowski | |
| 6,045,165 A | 4/2000 | Sugino et al. | |
| 6,056,324 A | 5/2000 | Reimert et al. | |
| 6,070,912 A | 6/2000 | Latham | |
| 6,173,968 B1 | 1/2001 | Nelson et al. | |
| 6,347,814 B1 | 2/2002 | Cerruti | |
| 6,349,979 B1 | 2/2002 | Noel et al. | |
| 6,412,831 B1 | 7/2002 | Noel et al. | |
| 6,447,025 B1 | 9/2002 | Smith | |
| 6,478,344 B2 | 11/2002 | Pallini, Jr. et al. | |
| 6,481,760 B1 | 11/2002 | Noel et al. | |
| 6,494,499 B1 | 12/2002 | Galle, Sr. et al. | |
| 6,550,822 B2 | 4/2003 | Mannella et al. | |
| 6,557,906 B1 | 5/2003 | Carcagno | |
| 6,581,940 B2 | 6/2003 | Dittel | |
| 6,752,436 B1 | 6/2004 | Verdillon | |
| 6,755,447 B2 | 6/2004 | Galle, Jr. et al. | |
| 6,764,108 B2 | 7/2004 | Ernst et al. | |
| 6,814,358 B2 | 11/2004 | Keck | |
| 6,851,727 B2 | 2/2005 | Carcagno et al. | |
| 6,857,668 B2 | 2/2005 | Otten et al. | |
| 6,883,804 B2 | 4/2005 | Cobb | |
| 6,905,150 B2 | 6/2005 | Carcagno et al. | |
| 6,921,110 B2 | 7/2005 | Morotti et al. | |
| 6,971,681 B2 | 12/2005 | Dell'Erba et al. | |
| 6,991,267 B2 | 1/2006 | Ernst et al. | |
| 7,014,223 B2 | 3/2006 | Della Pina et al. | |
| 7,066,499 B2 | 6/2006 | Della Pina et al. | |
| 7,108,063 B2 | 9/2006 | Carstensen | |
| 7,255,374 B2 | 8/2007 | Carcagno et al. | |
| 7,284,770 B2 | 10/2007 | Dell'erba et al. | |
| 7,310,867 B2 | 12/2007 | Corbett, Jr. | |
| 7,431,347 B2 | 10/2008 | Ernst et al. | |
| 7,464,449 B2 | 12/2008 | Santi et al. | |
| 7,475,476 B2 | 1/2009 | Roussie | |
| 7,478,842 B2 | 1/2009 | Reynolds, Jr. et al. | |
| 7,506,900 B2 | 3/2009 | Carcagno et al. | |
| 7,621,034 B2 | 11/2009 | Roussie | |
| 7,735,879 B2 | 6/2010 | Toscano et al. | |
| 7,753,416 B2 | 7/2010 | Mazzaferro et al. | |
| 8,215,680 B2 | 7/2012 | Santi | |
| 8,262,094 B2 | 9/2012 | Beele | |
| 8,262,140 B2 | 9/2012 | Santi et al. | |
| 8,333,409 B2 | 12/2012 | Santi et al. | |
| 8,544,304 B2 | 10/2013 | Santi | |
| 8,636,856 B2 | 1/2014 | Altschuler et al. | |
| 8,840,152 B2 | 9/2014 | Carcagno et al. | |
| 9,004,544 B2 | 4/2015 | Carcagno et al. | |
| 2002/0153671 A1* | 10/2002 | Raymond et al. | 277/608 |
| 2002/0158469 A1* | 10/2002 | Mannella | E21B 17/042 |
| | | | 285/333 |
| 2003/0168859 A1 | 9/2003 | Watts | |
| 2004/0118490 A1 | 6/2004 | Klueh et al. | |
| 2004/0118569 A1 | 6/2004 | Brill et al. | |
| 2004/0195835 A1 | 10/2004 | Noel et al. | |
| 2004/0262919 A1 | 12/2004 | Dutilleul et al. | |
| 2005/0012278 A1 | 1/2005 | Delange | |
| 2005/0093250 A1 | 5/2005 | Santi et al. | |
| 2005/0166986 A1 | 8/2005 | Dell'erba et al. | |
| 2006/0006600 A1 | 1/2006 | Roussie | |
| 2006/0273586 A1 | 12/2006 | Reynolds, Jr. et al. | |
| 2007/0039149 A1 | 2/2007 | Roussie | |
| 2007/0246219 A1 | 10/2007 | Mannella et al. | |
| 2008/0264129 A1 | 10/2008 | Cheppe et al. | |
| 2008/0303274 A1 | 12/2008 | Mazzaferro et al. | |
| 2010/0181727 A1 | 7/2010 | Santi et al. | |
| 2010/0187808 A1 | 7/2010 | Santi | |
| 2011/0008101 A1 | 1/2011 | Santi et al. | |
| 2011/0041581 A1 | 2/2011 | Santi | |
| 2011/0042946 A1 | 2/2011 | Santi | |
| 2011/0097235 A1 | 4/2011 | Turconi et al. | |
| 2011/0133449 A1 | 6/2011 | Mazzaferro | |
| 2011/0233925 A1 | 9/2011 | Pina | |

(56) References Cited

U.S. PATENT DOCUMENTS

| | | |
|---|---|---|
| 2011/0233926 A1 | 9/2011 | Carcagno |
| 2012/0032435 A1 | 2/2012 | Carcagno |
| 2015/0368986 A1 | 12/2015 | Narikawa |

FOREIGN PATENT DOCUMENTS

| | | | |
|---|---|---|---|
| DE | 3310226 A1 | | 10/1984 |
| EP | 0 032 265 | | 7/1981 |
| EP | 0 104 720 | | 4/1984 |
| EP | 159385 A1 | * | 10/1985 |
| EP | 0 309 179 | | 3/1989 |
| EP | 0 340 385 | | 11/1989 |
| EP | 0 989 196 | | 3/2000 |
| EP | 1 065 423 | | 1/2001 |
| EP | 1 277 848 | | 1/2003 |
| EP | 1 296 088 | | 3/2003 |
| EP | 1 362977 | | 11/2003 |
| EP | 1 705 415 | | 9/2006 |
| EP | 1 726 861 | | 11/2006 |
| EP | 2 000 629 | | 12/2008 |
| FR | 1 149 513 A | | 12/1957 |
| FR | 2704042 A | | 10/1994 |
| FR | 2 848 282 A1 | | 6/2004 |
| GB | 1 398 214 | | 6/1973 |
| GB | 1 428 433 | | 3/1976 |
| GB | 2 276 647 | | 10/1994 |
| GB | 2 388 169 A | | 11/2003 |
| JP | 58-187684 | | 12/1983 |
| JP | S61-031793 | | 2/1986 |
| JP | S61-103061 | | 5/1986 |
| JP | H06-042645 | | 2/1994 |
| JP | 07-139666 | | 5/1995 |
| JP | 2704042 | | 10/1997 |
| JP | 2002-130554 | | 5/2002 |
| JP | 2005-180614 | | 7/2005 |
| JP | 2006-144902 | | 6/2006 |
| WO | WO 84/02947 | | 8/1984 |
| WO | WO 94/29627 | | 12/1994 |
| WO | WO 96/22396 | | 7/1996 |
| WO | WO 00/06931 | | 2/2000 |
| WO | WO 01/75345 | | 10/2001 |
| WO | WO 02/29290 | | 4/2002 |
| WO | WO 02/35128 | | 5/2002 |
| WO | WO 02/068854 | | 9/2002 |
| WO | WO 02/086369 | | 10/2002 |
| WO | WO 02/093045 | | 11/2002 |
| WO | WO 03/087646 | | 10/2003 |
| WO | WO 2004/033951 | | 4/2004 |
| WO | WO 2004/053376 | | 6/2004 |
| WO | WO 2006/087361 | | 4/2006 |
| WO | WO 2007/002576 | | 1/2007 |
| WO | WO 2007/017082 | | 2/2007 |
| WO | WO 2007/017161 | | 2/2007 |
| WO | WO 2007/028443 | | 3/2007 |
| WO | WO 2007/063079 | | 6/2007 |
| WO | WO 2008/090411 | | 7/2008 |
| WO | WO 2009/000851 | | 12/2008 |
| WO | WO 2009/000766 | | 1/2009 |
| WO | WO 2009/010507 | | 1/2009 |
| WO | WO 2009/027308 | | 3/2009 |
| WO | WO 2009/027309 | | 3/2009 |
| WO | WO 2009/106623 | | 9/2009 |
| WO | WO 2010/122431 | | 10/2010 |

OTHER PUBLICATIONS

U.S. Appl. No. 13/073,917, filed Mar. 28, 2011, Carcagno, et al.
Chang, L.C., "Microstructures and reaction kinetics of bainite transformation in Si-rich steels," XP0024874, Materials Science and Engineering, vol. 368, No. 1-2, Mar. 15, 2004, pp. 175-182, Abstract, Table 1.
International Preliminary Report on Patentability dated Jan. 19, 2010 from PCT Application No. PCT/EP2008/059226.
International Written Opinion as mailed on Jan. 16, 2010 in PCT Application No. PCT/EP2008/059226.
International Search Report as mailed on Nov. 5, 2008 in PCT Application No. PCT/EP2008/059226.
"Specification for Threading, Gauging and Thread Inspection of Casing, Tubing, and Line Pipe Threads," American Petroleum Institute, Specification 5B, Apr. 2008, 15th Edition, in 140 pages.
"Specification for Threading, Gauging and Thread Inspection of Casing, Tubing, and Line Pipe Threads," American Petroleum Institute (API) Specification 5B, Apr. 2008, 15th Edition (Section 4.1.14 only).

* cited by examiner

THREADED JOINT WITH RESILIENT SEAL RING

CROSS-REFERENCE TO RELATED APPLICATIONS

This application is a U.S. National Phase of PCT International Application No. PCT/EP2008/059226, filed Jul. 15, 2008 and published as WO 2009/010507 on Jan. 22, 2009, which claims priority to European Application No. 07112536.3, filed Jul. 16, 2007. The disclosure of both prior applications is incorporated by reference in their entirety and should be considered a part of this specification.

FIELD OF THE INVENTION

The present invention relates to threaded joints, in particular for connecting tubes of predefined length to make strings used in the hydrocarbon industry especially for use in the field of OCTG (Oil Country Tubular Goods) and in line pipes in offshore applications.

BACKGROUND OF THE INVENTION

Searching for oil or, more generally, hydrocarbons has become more demanding in terms of hardware and devices in recent years because oil and gas fields or reservoirs are located deeper under the earth's surface or in places difficult to reach below the sea bed. Prospecting for and exploitation of hydrocarbon fields demands hardware which is more resistant to environmental challenges such as higher loads and corrosion, which were less important in the past.

Modern joints are generally designed with metal to metal seals made by the contact between two surfaces, usually at one end or at both ends of the threaded portion of the joint, interfering in the elastic range of the modulus of elasticity for an appropriate stress magnitude. However in specific situations, resilient seals are needed instead of or in combination with metallic seals to prevent penetration of external fluids in the interstices of the threads.

It is therefore a design requirement that the joint seals resist penetration of the external fluids, or at least do not allow continuous exchange of fluids that have already penetrated the joint with the surrounding fluids, in order to reduce the corrosion rate.

To solve the mentioned problems various solutions have been provided, one of which consists of inserting a seal ring made of polymeric material, e.g. an O-ring, at the extremity of the joint near the threaded portion.

It is a widespread practice to use O-rings pre-mounted onto the box, but this practice has an important disadvantage: the seal rings can be damaged during mounting of the ring and/or during make-up.

As they are pre-mounted onto the box, when making up the box the seal is dragged together with the box over the pin's threads. Due to the diametrical interferences needed between pin, box and seal dimensions for the seals to work properly, along with the geometric parameters of the connection such as thread profile, pitch, taper angle, stab angle, etc, the seals are inevitably forced to crawl over the pin's threads, resulting in damage to the lower surfaces of the seals or in permanent deformations which later would jeopardize the sealing efficiency during operation.

Seal rings having more complicated shape have also been proposed, e.g. rings with an "H" or "U" cross-section to increase efficiency and prevent sea water from penetrating into the gaps of the joint. However such seal rings are subject to such stresses and adverse environmental conditions, both during the initial make-up operation and during operational life, that their efficiency is much reduced after some time. Even though pre-mounting on the pin would be less harmful for the seal ring, some field applications require simpler seal rings which must be pre-mounted onto the box.

U.S. Pat. No. 6,550,822 discloses a threaded joint including a water exclusion seal which is a pressure energized elastomeric seal positioned in a groove near each end of the coupling to form a radial seal between the unthreaded area at each end of the coupling and the unthreaded cylindrical area adjacent each end of the tubular section.

The shape of the ring section does not facilitate its dragging over the thread during make up. Because of its shape, the sharp corners hit the thread crests and are prone to get stuck in the thread. In the event of joint break-out it is even easier to damage the seal ring.

In case of failure, the portion of the pin with the vanishing thread remains unprotected against possible external corrosive fluids, since dope used to lubricate the joint is easily washed away.

This joint uses standard seal rings available on the market. Therefore, the same ring design must be used under different connections, and does not provide for customization of the ring geometry for each pin taper, stab angle, thread height and pitch, etc.

The cavity between the lips renders the housing fragile, making it prone to rupture during break-out of the connection, where the lower part of the housing is dragged over the pin's threads, causing high deformation and possible breakage.

There have been many attempts to design improved configurations for seal rings to be housed in the vicinity of the nose of the box, but all are insufficient to withstand the higher requirements set for current joints.

SUMMARY OF THE INVENTION

It is therefore an object of the present invention to provide a threaded joint which overcomes the aforementioned drawbacks.

The principal object of the present invention is to provide a joint having an innovative seal ring ensuring both a simple and reliable initial make-up and a high sealing efficiency during operation.

The above mentioned objects are achieved in accordance with the present invention by means of a threaded joint comprising a male threaded tube, defined as the pin, and a female threaded tube, defined as the box, and a seal ring, the pin being adapted to be made up in the box, the seal ring being interposed between the pin and the box, it being located on a portion of the surface of the box between the end of a threaded section and the nose of the box, and being in tight sealing contact via an external surface with an internal surface of the box and via an internal surface with an external surface of the pin, the seal ring having a first base, a second base axially opposite to the first base, at least two protruding annular ribs on the external surface, the internal surface of said seal ring comprising, in its unloaded position, two frustoconical annular surfaces tapering towards the center of the seal ring and joined by a fillet.

The joint of the invention with a seal ring of novel design ensures reusability of the seal ring, or at least it is more reliable in cases where no spare O-rings are available. In contrast, break-out of most prior art threaded joints, incorporating well-known O-rings with circular cross-section, damages the original O-ring. Thus a new seal ring must be used for the new make up operation, because the original one has been damaged both by the first make up and by break-out.

The advantage of the invention is to provide a threaded joint reliable in real field operative conditions, where reliability is crucial and reduction in operative costs in terms of time and tasks are desirable.

The housing for the seal ring of the joint is configured to match in the best manner the shape of the seal ring, and vice versa, whereby the seal ring works synergistically with the housing both during and after make up.

Advantageously, this synergy is obtained without increasing costs since the groove of the invention is easy to make and is not more complex or expensive to produce than the currently used groove configurations, which house standard O-rings of circular cross-section. In addition the simple shape of the housing cross-section combined with that of the seal ring reduces the overall dimensions of the groove when compared to the dimensions of those grooves for O-rings of circular cross-section since the diameter of the circular cross-section determines the depth of the groove. As shown in FIG. 1, which represents two standard O-rings mounted on state of the art joints, since an O-ring of large diameter would be preferable to avoid getting stuck between two adjacent crests of the pin thread during make up, this entails machining a deeper groove (example on the right), and the thickness of the wall w of the box in that portion would be significantly reduced as well as joint wall strength compared to an O-ring of smaller diameter (left example) which entails a wall thickness w'.

Advantageously a coating can be applied to the surfaces contacted by the seal ring for protecting the machined surface of the pin close to the vanishing thread region of the joint which is likely to be exposed to contact by corrosive external agents.

BRIEF DESCRIPTION OF THE DRAWINGS

The foregoing and other objects will become more readily apparent by referring to the following detailed description and the appended drawings in which.

DETAILED DESCRIPTION

Figure 1:
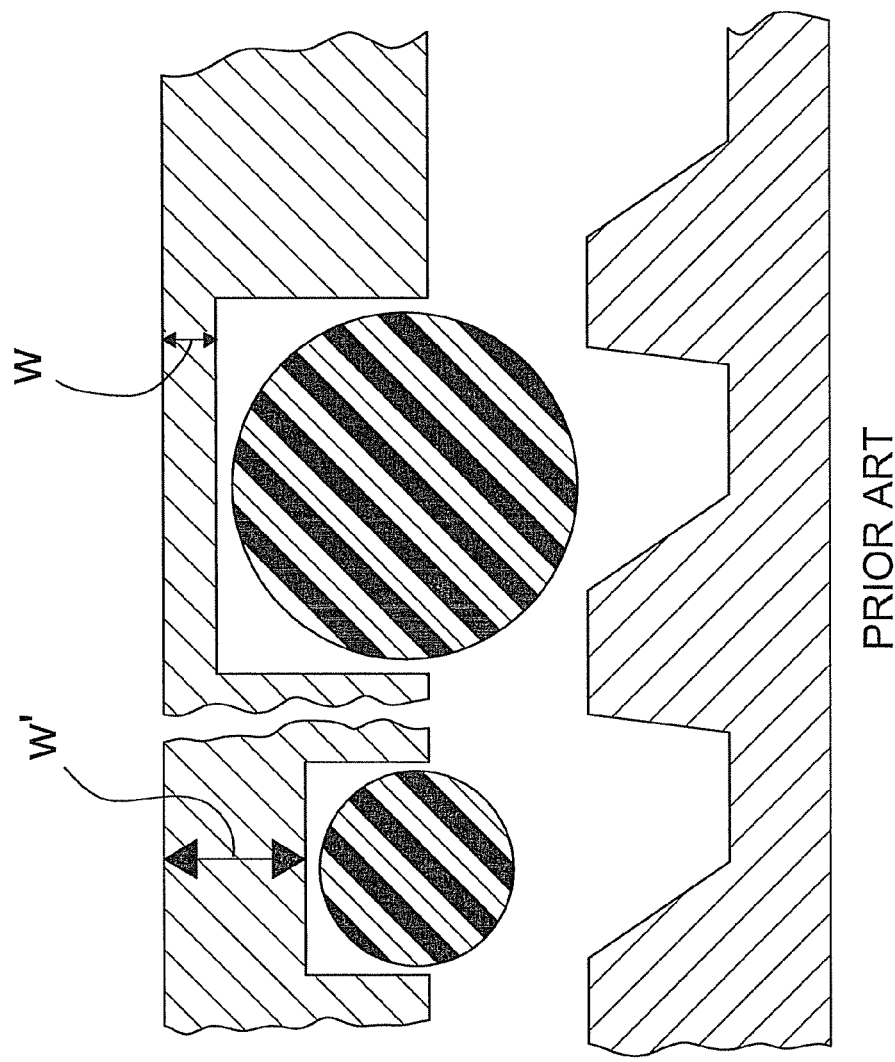
FIG. 1 shows an enlarged view of a detail of a threaded joint with O-rings of the prior art.
Figure 1A:
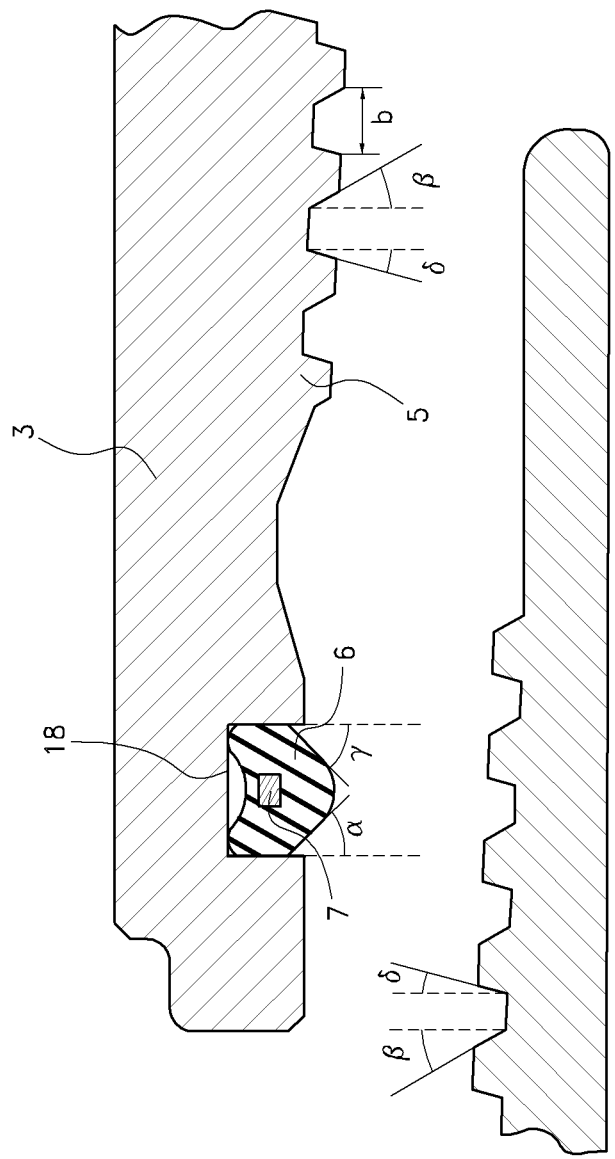
FIG. 1A shows a sectional view on an axial plane of the joint in accordance with the present invention before make up.

With particular reference to the FIGS. 1A to 3, there is shown a threaded joint indicated overall by reference numeral 1, connecting two tubes, a male tube, commonly called a pin 2, with a nominal external diameter D, and a female tube also called a box 3, of external diameter D1, equal to or greater than D.

The pin 2 has a threaded portion 4 with male threads of appropriate profile, e.g. trapezoidal, and the box 3 has an internal threaded portion 5 with female threads.

The common axis of the pin 2 and box 3 is indicated with A. The box ends with a nose 15.

The portion of the box 3 near the end of the thread 5 comprises an annular groove 18 between box nose 15 and the thread end. This groove 18 is the housing of a seal ring 6.

Figures 2, 3:
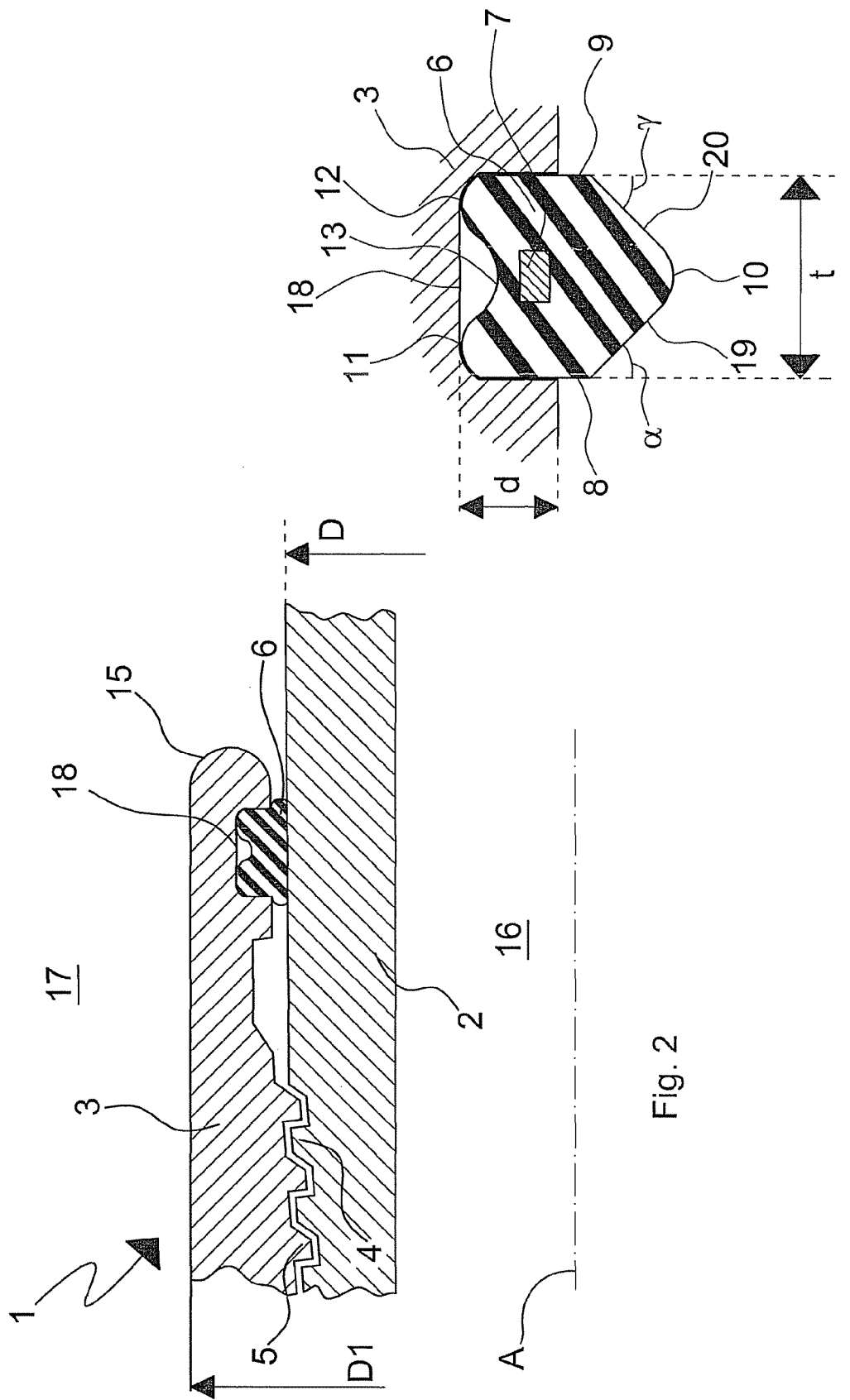
FIG. 2 shows a sectional view on a longitudinal axial plane of the joint in accordance with the present invention after make up.

With particular reference to FIG. 3, which shows a section of the ring 6 in the unloaded position located in its groove 18 in the box 3, the seal ring 6 has an external surface with two annular ribs 11, 12 separated by an annular furrow 13. The ribs 11, 12 have crests preferably rounded or of any other appropriate shape. When positioned in the groove 18 the external side of the ring 6 contacts the bottom of the groove 18. This bottom is preferably flat in the axial direction, to make machining easier.

The furrow 13 and the ribs 11, 12 present two main advantages:
- on one side the furrow 13 works as a lung, providing the needed radial deformation to allowing the internal surface of the ring 6 to be squeezed more easily.
- on the other side the ribs 11, 12 generate a load concentration, thus increasing sealing contact and acting as double independent sealing barriers.

The seal ring 6 has two bases 8, 9 axially opposite to each other. One or both bases 8, 9 are substantially, but not exclusively, flat.

The internal surface of the seal ring 6 has two frustoconical surfaces or flanks 19, 20 that are V-shaped, when seen in the axial section. The taper angle $\alpha$ of the surfaces 19, 20 can be defined as a function of thread parameters, i.e. taper, stab angle, etc. A preferred value for the angle $\alpha$ is 45°.

Figure 3A:
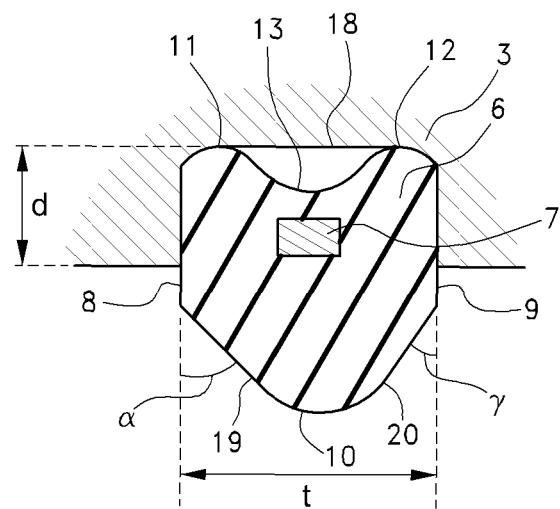
FIG. 3A shows a sectional view of an alternate embodiment of the seal ring of the joint of FIG. 1A in its unloaded position.

The taper of each surface 19 and 20 can also have different values for the taper angles $\alpha$ and $\gamma$. This embodiment is shown in particular in FIG. 3A.

In a further particularly advantageous embodiment of the joint, the seal ring 6 has a section with specific dimensions.

The thickness "t" of the seal ring 6 in the axial direction is defined by the thread width, the thickness "t" of the ring 6 being larger than the axial length of the void "b" between two crests of the thread. This facilitates jump over of the crests by the seal ring apex 10 during make up.

The depth "d" of the groove 18 of the box 3 in the radial direction is preferably between 3 and 15 mm. The groove 18 should house about 75% of the thickness of the seal ring 6 in the radial direction.

The taper angles $\alpha$ and $\gamma$ of the flanks 19 and 20 are chosen such that the following relationships with the stab angle $\beta$ and load angle $\delta$ of the thread flanks are satisfied:

$$\alpha > \beta \text{ and}$$

$$\gamma > \delta.$$

The apex 10 of the ring where the two tapered frustoconical surfaces 19 and 20 meet has preferably a rounded shape like a fillet when seen in section. The seal ring 6 is a simple but effective improvement over conventional O-rings currently used in the field. Main advantages consist in its frustoconical annular surfaces 19, 20, tapering towards the center of the seal ring 6 and joined by the apex or fillet 10 therebetween, which facilitate forward or backward movement of the seal ring 6 over the threads, thus avoiding damage. Moreover, the internal surface of the seal ring 6 also generates a load concentration thus increasing sealing contact and therefore improving sealability of the seal ring 6 when made up.

The seal ring can be made of elastomeric materials, which in this application is intended to include any natural or synthetic material having elastic properties including rubbers, plastics, polymers, etc.

The joint defines an inner space 16, containing the axis A of the pin and box, in which the fluid, for example a hydrocarbon, such as natural gas or petroleum or other similar fluid, flows and an outer space 17 which can be in contact with fluids of various kinds, such as sea water in some applications.

The ring 6 offers an important protection to the joint 1, on the outside of the joint 1 since it is located at the extremity of the box 3, thus preventing external fluids which occupy the space 17 from leaking into the threaded zone of the joint 1.

In an advantageous embodiment, a reinforcement ring 7 of different material, preferably metal, stronger than the plastic material of the seal ring can be added, by embedding such a reinforcement ring 7 inside the body of the seal ring 6.

Advantageously a coating is applied to those surfaces of both the pin 2 and box 3 which remain in contact with the seal ring 6.

The threaded joint of the invention offers improved sealability and protection against make up and break-out damage by virtue of the aforementioned features. The joint is to be used preferably in the field of OCTG and line pipe connections for the oil & gas industry, especially in offshore applications. It can be employed at depths up to 3500 m, at which the threaded part remains protected from external water infiltration.

What is claimed is:

1. A threaded joint comprising:
   a male threaded pin, a female threaded box, and a seal ring,
   the pin being configured to be made up in the box along an axial axis having a proximal direction and a distal direction, the pin comprising an external surface having an unthreaded section and a threaded section, the threaded section having threads,
   the box comprising a groove configured to receive the seal ring, the groove comprising a proximal lateral wall, a distal lateral wall, and a generally flat bottom, wherein when the seal ring is received in the groove and the seal ring is in a compressed state in which the pin is fully made up in the box:
      the seal ring is radially located between the pin and the box, and
      the seal ring is axially located between a nose of the box located at a distal end of the box and a distalmost end of a threaded section of the box that is nearest the nose of the box,
      the seal ring is in sealing contact via a radially external surface of the seal ring with the groove of the box and via a radially internal surface of the seal ring with the external surface of the pin, and
      substantially the entire radially internal surface of the seal ring is compressed against the unthreaded section of the external surface of the pin,
   wherein, when the seal ring is received in the groove and the seal ring is in an uncompressed state, the seal ring comprises:
      a substantially flat first base having a portion abutted with the proximal lateral wall of the groove;
      a substantially flat second base axially opposite the first base and having a portion abutted with the distal lateral wall of the groove;
      at least two radially-protruding annular ribs on the radially external surface that contact the bottom of the groove of the box;
      first and second annular surfaces on the radially internal surface, the first and second annular surfaces tapering towards an axial center of the seal ring and joined by a fillet, the fillet comprising a continuous curve between the first and second annular surfaces;
      wherein the first annular surface intersects the first base at a position outside of the circumferential groove and the second annular surface intersects the second base at a position outside of the circumferential groove;
      wherein the tapering annular surfaces and the continuously curved fillet together facilitate forward or backward movement of the seal ring over the threads of the pin, thereby inhibiting damage to the seal ring; and
      an embedded reinforcement ring that is positioned within the groove;
   wherein, when the seal ring is received in the groove and the seal ring is in the compressed state, the seal ring comprises:
      a first component that is positioned in the groove, the first component comprising:
         the portion of the substantially flat first base that is abutted with the proximal lateral wall;
         the portion of the substantially flat second base that is abutted with the distal lateral wall;
         the at least two radially-protruding annular ribs;
         the reinforcement ring; and
         an axial length that is substantially equal to the axial length of the circumferential groove;
      a second component that is positioned outside the groove, the second component comprising:
         a proximal protrusion that extends between the pin and the box in the proximal direction,
         a distal protrusion that extends between the pin and the box in the distal direction,
         wherein the distance between an end of the proximal protrusion and an end of the distal protrusion is greater than the axial length of the circumferential groove; and
         a generally flat compression interface along which the radially internal surface of the seal ring is compressed against the external surface of the pin, the compression interface having an axial length that is greater than the axial length of the circumferential groove.

2. A threaded joint according to claim 1, wherein said annular surfaces have equal taper angles.

3. A threaded joint according to claim 1, wherein said annular surfaces have unequal taper angles.

4. A threaded joint according to claim 3, wherein one of the two annular surfaces defines a first taper angle α relative to the first base and another of the two annular surfaces defines a second taper angle γ relative to the second base, wherein the pin threads have a stab angle β and a load angle δ, and wherein α is greater than β and γ is greater than δ.

5. A threaded joint according to claim 1, wherein the seal ring comprises an elastomeric material.

6. A joint according to claim 1, wherein a coating is applied to those surfaces of the pin and box which remain in contact with the seal ring.

7. A threaded joint comprising:
   a threaded pin comprising threads;
   a threaded box comprising threads and a circumferential groove, the circumferential groove comprising first and second lateral sidewalls, a generally flat bottom, and an axial length, the threaded box being coupled to the threaded pin, the threads of the pin and the threads of the box each comprising a stab angle β and load angle δ; and
   a seal ring housed in the circumferential groove in the box, the seal ring being radially positioned between the coupled pin and box and axially positioned between a nose of the box and a threaded section of the box closest to the nose;

wherein in an uncompressed state, the seal ring comprises:
  a first base abutted with the first lateral wall of the groove,
  a second base abutted with the second lateral wall of the groove, the second base axially opposite the first base,
  a radially external surface facing the groove of the box and comprising a plurality of radially-protruding annular ribs that contact the bottom of the groove, the annular ribs connected by a curved furrow, and
  a radially internal surface comprising:
    a first tapered surface that intersects with the first base at a position outside of the circumferential groove; and
    a second tapered surface that intersects with the second base at a position outside of the circumferential groove;
    wherein the first and second surfaces are configured to contact an external surface of the pin and are connected by an apex, the apex comprising a continuous curve between the first tapered surface and the second tapered surface;
    wherein the first tapered surface defines an angle α relative to the first base, and the second tapered surface defines an angle γ relative to the second base; and
    wherein α is greater than β and γ is greater than δ, which facilitates forward or backward movement of the seal ring over the threads of the pin, thereby inhibiting damage to the seal ring; and
  a reinforcement ring positioned within the groove;
  wherein, in a compressed state in which the threaded box is substantially fully coupled with the threaded pin, the seal ring comprises a first portion that is positioned in the circumferential groove and a second portion that is positioned outside the circumferential groove, wherein:
    the first portion comprises the first base in abutment with the first lateral wall of the groove, the second base in abutment with the second lateral wall of the groove, the radially external surface with the plurality of radially-protruding annular ribs in contact with the bottom of the groove, and the reinforcement ring, the first portion having an axial length that is substantially equal to the axial length of the circumferential groove,
    the second portion comprises a first protrusion extending out of the groove in an axial direction, a second protrusion extending out of the groove in an opposite axial direction, and a generally flat compression interface along which the seal ring is compressed against the external surface of the pin, the compression interface having an axial length that is greater than the axial length of the circumferential groove.

8. A threaded joint according to claim 7, wherein the first base is substantially flat.

9. The joint according to claim 7, wherein the reinforcement ring has a rectangular cross-section.

10. The joint according to claim 9, wherein the reinforcement ring is completely embedded in the seal ring.

11. The joint according to claim 7, wherein α and γ are about equal.

12. The joint according to claim 11, wherein α and γ are about 45°.

13. The joint according to claim 7, wherein the radially external surface defining the annular ribs and the curved furrow is radially outwardly facing and comprises an undulating surface.

14. The joint according to claim 7, wherein the groove has a radial depth and the radial depth of the groove is about 3 to 15 mm.

15. The joint according to claim 7, wherein the seal ring further comprises a radial thickness that is about 75% contained in the groove.

16. The joint according to claim 7, wherein the apex is a fillet.

17. The joint according to claim 7, wherein adjacent threads of the threads of the threaded pin are separated by an axial distance, and wherein the seal ring comprises an axial thickness greater than the axial distance between adjacent threads of the threaded pin.

18. The joint according to claim 7, wherein the seal ring comprises an elastomeric material.

19. The joint according to claim 18, wherein the seal ring comprises a material selected from the group consisting of rubber, plastic, and polymer.

20. The joint according to claim 7, wherein the continuous curve is a convex curve.

21. The joint according to claim 20, wherein the joint further comprises a reinforcement ring that is:
  fully embedded in the seal ring when the seal ring is not radially compressed between the pin and the box; and
  positioned at an axial midpoint between the first and second bases.

22. The joint according to claim 7, wherein, when the seal ring is radially located between the pin and the box and the pin is fully made up in the box, a portion of the first base and a portion of the second base are generally parallel.

23. The joint according to claim 7, wherein the first and second lateral sidewalls are substantially parallel with each other.

24. The joint according to claim 23, wherein the first and second sidewalls are substantially planar.

25. The joint according to claim 7, wherein the circumferential groove in the box has a rectangular cross-section.

26. The joint according to claim 7, wherein substantially the entire radially internal surface of the seal ring is compressed against an unthreaded section of the pin.

* * * * *